(12) United States Patent
Samdadiya et al.

(10) Patent No.: US 7,522,608 B2
(45) Date of Patent: Apr. 21, 2009

(54) ENDPOINT SELECTION FOR A CALL COMPLETION RESPONSE

(75) Inventors: Parag Samdadiya, Bellevue, WA (US); Sameer D. Bedekar, Issaquah, WA (US); Sankaran Narayanan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 11/264,662

(22) Filed: Nov. 1, 2005

(65) Prior Publication Data
US 2007/0097994 A1    May 3, 2007

(51) Int. Cl.
*H04L 12/28* (2006.01)
*H04L 12/56* (2006.01)
(52) U.S. Cl. ............. 370/395.21; 370/392; 370/395.42; 370/396; 370/400; 370/401
(58) Field of Classification Search ............. 370/395.21
See application file for complete search history.

(56) References Cited

U.S. PATENT DOCUMENTS

| | | | | |
|---|---|---|---|---|
| 6,614,902 | B1 * | 9/2003 | Rizzetto ................ | 379/265.11 |
| 6,754,224 | B1 * | 6/2004 | Murphy ..................... | 370/432 |
| 6,985,961 | B1 * | 1/2006 | Ramsayer et al. ........... | 709/238 |
| 2003/0135569 | A1 * | 7/2003 | Khakoo et al. .............. | 709/206 |
| 2006/0095522 | A1 * | 5/2006 | Rang et al. ................... | 709/206 |
| 2006/0271635 | A1 * | 11/2006 | Raghav et al. .............. | 709/206 |

* cited by examiner

*Primary Examiner*—Daniel J Ryman
*Assistant Examiner*—Cassandra Decker
(74) *Attorney, Agent, or Firm*—Perkins Coie LLP

(57) ABSTRACT

Techniques for selecting a call completion response from a group of call completion responses based on weights associated with the call completion responses, are provided. A server processes a call invitation for a callee by forwarding the call invitation to each of the callee's endpoints. Each of the callee's endpoints associates a weight to its call completion response it generates to accept or reject the call invitation. The server waits to receive the call completion responses from each of the callee's endpoints or for a predetermined period of time (i.e., a timeout), and uses the weights associated with the received call completion responses to decide which of the received call completion responses to use to complete the call invitation.

10 Claims, 6 Drawing Sheets

ENDPOINT SELECTION FOR A CALL COMPLETION RESPONSE

BACKGROUND

Real-time conversations between conversation participants via their computer systems are becoming increasingly common. Such real-time conversations require that the participants be present at their computer systems (e.g., personal digital assistants) and able to respond when a communication is received. A common form of real-time conversation is provided by instant messaging services. An instant messaging service allows participants to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

To support real-time communications, communications applications typically need to establish and manage connections (also referred to as sessions or dialogs) between computing devices. A session is a set of interactions between computing devices that occurs over a period of time. As an example, real-time communications applications such as MESSENGER or VoIP establish sessions between communicating devices on behalf of users. These applications may use various mechanisms to establish sessions, such as the Session Initiation Protocol ("SIP"). SIP is an application-level control protocol that computing devices can use to discover one another and to establish, modify, and terminate sessions between computing devices. SIP is a proposed Internet standard. The SIP specification, "RFC 3261," is available at <http://www.ietf.org/rfc/rfc3261.txt>.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is an entity that acts as a server to clients and a client to servers. In so doing, proxy servers intercept, interpret, or forward messages between UACs and UASs. A redirect server accepts a SIP request and generates a response directing the UAC that sent the request to contact an alternate network resource. A registrar is a server that accepts registration information from user agents and informs a location service of the received registration information.

SIP supports two message types: requests, which are sent from a UAC to a UAS, and responses, which are sent from a UAS to a UAC when responding to a request. A SIP message is composed of three parts. The first part of a SIP message is a "request line," which includes fields to indicate a message method (e.g., INVITE) and a request URI that identifies the user or service to which the request is being directed. The second part of a SIP message comprises headers whose values are represented as name-value pairs. The third part of a SIP message is the message's body, which is used to describe the session to be initiated or contain data that relates to the session. Message bodies may appear in requests or responses.

For example, in an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call. A specification relating to presence information in instant messaging systems, "RFC 2778," is available at <http://www.ietf.org/rfc/rfc2778.txt>. A draft of a proposed specification relating to presence information using the Session Initiation Protocol ("SIP") is available at <http://www.ietf.org/internet-drafts/draft-ietf-simple-presence-10.txt>.

In a typical scenario, an endpoint registers with the presence server. The endpoint then sends SUBSCRIBE requests to the presence server for each of the contacts on the user's contact list specifying a non-zero subscription expiration and an event type of "presence." The presence server sends a response to each request indicating success or failure of the subscription. After a successful subscription, the presence server sends to the endpoint a NOTIFY request containing the current presence document of the subscribed-to contact. The endpoint sends a response to each NOTIFY request indicating success or failure of the notification. Therefore, an endpoint and server exchange four messages for each contact to which a user subscribes: a SUBSCRIBE request, SUBSCRIBE response, NOTIFY request, and NOTIFY response.

It is not uncommon for a user to register more than one endpoint with a presence server. For example, a user can register a personal digital assistant, a wireless telephone, a laptop computer, and a desktop computer as endpoints. Subsequently, an initiator of a conversation (e.g., a calling participant) may invite the user to participant in the conversation. Here, the calling participant's endpoint sends a SIP INVITE message to invite the user into the conversation. The SIP INVITE message is forwarded or forked by an intermediate server, such as a "forking" server, to all of the user's registered endpoints. The intermediate server typically waits to receive responses from one or more of the endpoints and sends one of the received responses to the calling participant's endpoint. The intermediate server arbitrarily chooses a response, typically the first response received from one of the user's endpoints, to send back to the calling participant's endpoint. More often than not, by arbitrarily choosing a response, the intermediate server fails to select the most appropriate or desirable response to send to the calling participant's endpoint.

SUMMARY

Techniques for selecting a call completion response from a group of call completion responses based on weights associated with the call completion responses, are provided. A server processes a call invitation for a callee by forwarding the call invitation to each of the callee's endpoints. Each of the callee's endpoints associates a weight to its call completion response it generates to accept or reject the call invitation. The server waits to receive the call completion responses from each of the callee's endpoints or for a predetermined period of time (i.e., a timeout), and uses the weights associated with the received call completion responses to decide which of the received call completion responses to use to complete the call invitation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
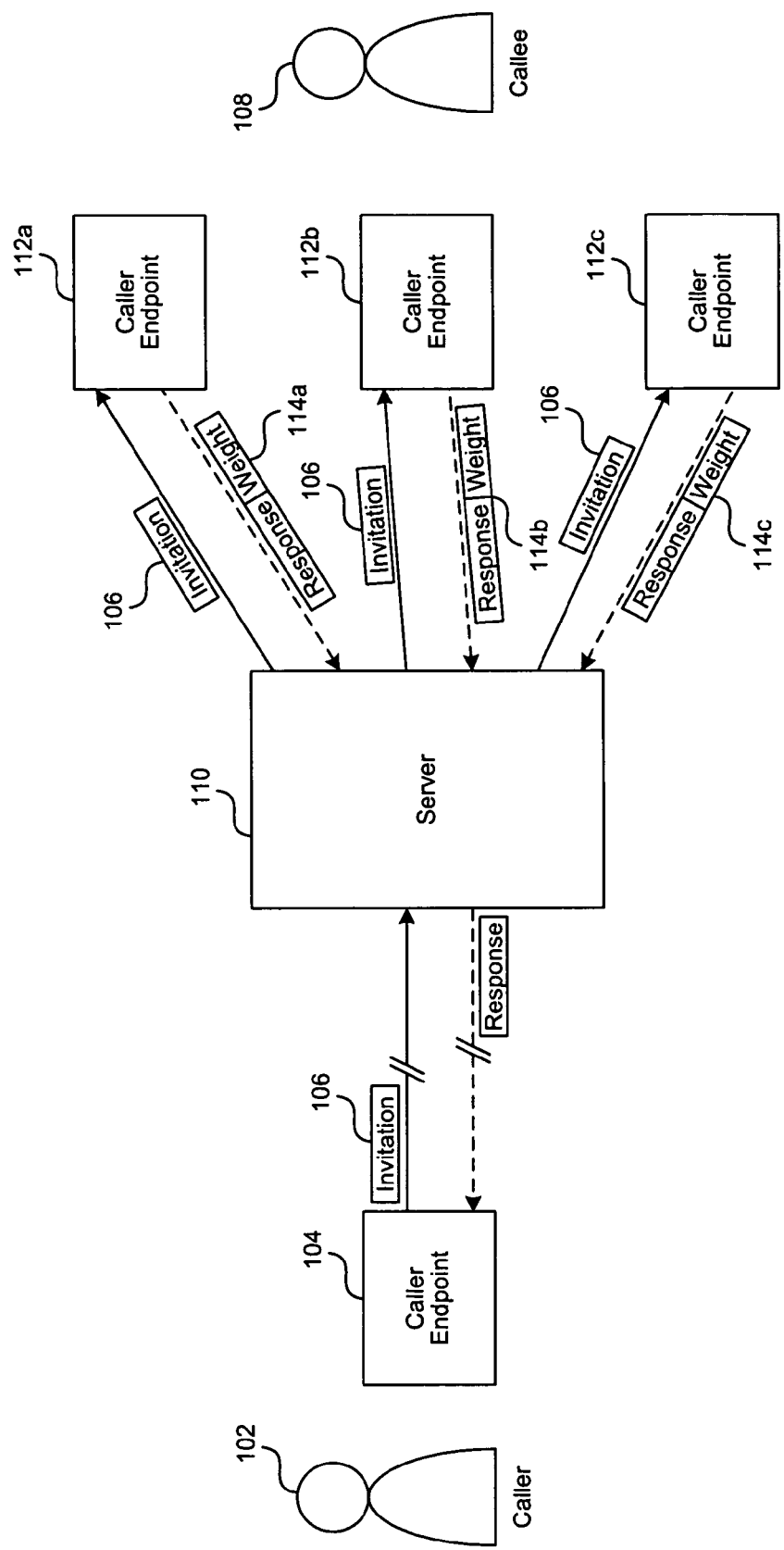
FIG. 1 is a block diagram that illustrates the sending of a call invitation between a caller endpoint and a plurality of callee endpoints and the selection of an appropriate response to the invitation by a server, according to some embodiments.

Various techniques for selecting a call completion response from a group of call completion responses based on weights associated with the call completion responses, are provided. In some embodiments, when a server receives a call invitation for a callee, the server forwards the call invitation to each of the callee's endpoints. When a callee's endpoint receives the call invitation, the endpoint associates a weight with a call completion response the endpoint generates to accept or reject the incoming call invitation. The weight may be a numerical value within a range such as, by way of example, 0.0 (zero) to 1.0 (one). The endpoint may derive the weight based on one or more factors, such as, by way of example, the type of call completion response, the presence of the callee at the endpoint device, the hardware or functional capabilities of the endpoint device, the usage history of the endpoint device (i.e., history of the callee's use of the endpoint device), the version of the client application (e.g., IM application, VoIP application, application sharing application, etc.) executing on the endpoint device, etc. For example, the presence of the callee at the endpoint may be determined by detecting input/out use on the endpoint device (e.g., detecting keyboard use), by checking a calendaring application on the endpoint device, from callee-provided input (e.g., "away," "be right back," etc.), by checking the state (e.g., collapsed, expanded, etc.) of application windows on the endpoint device, etc. The endpoint may specify the derived weight in a protocol header, such as a SIP header "MS-Response-Priority: weight," and send the weight as part of the call completion response message. The server waits to receive the call completion responses from each of the callee's endpoints or for a predetermined period of time (i.e., a timeout), and uses the weights associated with the received call completion responses to decide which of the received call completion responses to use to complete the call invitation. This is the call completion response that will be seen by the originator of the call invitation (i.e., the caller) when the server forwards the selected call completion response to the caller.

In some embodiments, the server waits for a predetermined period of time to receive call completion responses from the callee's endpoints and selects the call completion response with the highest (i.e., largest) weight as the appropriate call completion response. The server then forwards the appropriate call completion response back to the originator of the call invitation. If there is a tie in the weights, the server may break the tie, for example, using random selection or based on one or more selection factors (e.g., first to respond). By way of example, an initiator of a conversation (i.e., a caller endpoint) sends a SIP INVITE message. The SIP INVITE message may be forked by an intermediate server, such as MICROSOFT's Live Communications Server, to multiple callee endpoints, such as, by way of example, E1 and E2. E1 may determine that the call invitation contains unsupported parameters, and decide to reject the call using SIP response code 488. E2 may determine that the user (i.e., the callee) is unavailable, and decide to reject the call using SIP response code 480. E1 and E2 each computes a weight for their respective call completion responses based on some local information, such as the presence availability, activity, device capabilities, etc., and sends the calculated weight with its call completion response to the server. For example, E1 may calculate the weight to be 0.75 (e.g., MS-Response-Priority: 0.75), and E2 may calculate the weight to be 0.50 (e.g., MS-Response-Priority: 0.50). The server inspects all of the received call completion responses and picks the call completion response with the highest weight (i.e., E1's call completion response having a weight of 0.75), and forwards the call completion response having SIP response code 488 back to the caller.

By way of another example, E1 above may determine that the call invitation contains an unsupported SIP extension, and decide to reject the call using SIP response code 420. But, E1 may determine that the caller endpoint is capable of retrying the call invitation (i.e., call) without the unsupported extension. Hence, E1 may calculate the weight to be 0.75 (e.g., MS-Response-Priority: 0.75). E2 above may determine that the user (i.e., the callee) is busy, and decide to reject the call using SIP response code 486, and calculate the weight to be 0.50 (e.g., MS-Response-Priority: 0.50). The server inspects the call completion responses received from E1 and E2 and picks the call completion response with the highest weight (i.e., E1's call completion response having a weight of 0.75), and forwards the call completion response having SIP response code 420 back to the caller. In a variation to this example, E1 may be able to determine that the caller endpoint is not capable of retrying the call without the unsupported extension. This implies that the two endpoints (i.e., the caller endpoint and E1) are incompatible with each other. In this instance, E1 may calculate the weight to be 0.10 (e.g., MS-Response-Priority: 0.10), causing the server to select E's call completion response having SIP response code 486 with a weight of 0.50 to forward to the caller.

By way of still another example, both E1 and E2 above may be configured to respond with SIP response code 480 after four rings of the call. However, E1's status may be set to "Away," while E2's status is set to "Be Right Back." The callee may have specified the aforementioned status on the respective endpoints. The "Be Right Back" status may have a higher availability rank than "Away." Consequently, E1 may calculate the weight to be 0.50 (e.g., MS-Response-Priority: 0.50), and E2 may calculate the weight to be 0.75 (e.g., MS-Response-Priority: 0.75). The server inspects the call completion responses received from E1 and E2 and picks the call completion response with the highest weight (i.e., E2's call completion response having a weight of 0.75), and forwards E2's call completion response having SIP response code 480 back to the caller.

In some embodiments, the server forwards the first call completion response which accepts the call invitation back to the caller. The endpoint that is accepting the call typically sends a call completion response having a weight of 1.0. In these embodiments, the server need not wait to receive all of the call completion responses from the callee's endpoints. Stated another way, the server waits to receive the first call completion response that accepts the call invitation and, without waiting to receive call completion responses from the callee's endpoints that have yet to respond or for the timeout to occur, forwards the call completion response accepting the call invitation back to the caller.

In some embodiments, a callee endpoint responding to a call invitation may augment its call completion response with an indication for the server to wait for all branches to complete (i.e., wait to receive call completion responses from all of the endpoint to which the server forwarded the call invitation) even though the server receives success responses (i.e., call completion responses that accept the call invitation). The endpoint may provide this indication by augmenting the SIP MS-Response-Priority header, or other suitable SIP header, with a "WaitForAllBranches=True" parameter. If this parameter is present, the server waits to receive the call completion responses from the other endpoints or for a predetermined period of time (i.e., a timeout), and uses the weights associated with the received call completion responses to decide which of the received call completion responses to use to complete the call invitation. By way of example, E1 and E2 above may be configured to always accept an incoming call (e.g., auto-accept mode is enabled). In this instance, E1 and E2 may each calculate a weight as, for example, a function of one or more of current availability, activity, and device capabilities. E1 and E2 can then send the calculated weight and the WaitForAllBranches=True parameter with a call completion response accepting the call to the server. Even though both E1 and E2 accept the call, E1 and E2 may have calculated different weights due to differences in the aforementioned factors (e.g., current availability, activity, device capabilities, etc.). Upon receipt of either of the call completion responses, the server notices the presence of the parameter and waits to receive the call completion response from the other endpoint. Subsequent to receiving all of the responses, the server picks the call completion response with the highest weight and forwards that call completion response back to the caller.

In some embodiments, a callee endpoint responding to a call invitation may augment its call completion response with an indication for the server to send its response immediately, without waiting to receive call completion responses from the other endpoints. The endpoint may provide this indication by augmenting the SIP MS-Response-Priority header, or other suitable SIP header, with a "MustSendImmediately=True" parameter. By way of example, E1 above may determine that the call invitation is for an unsupported media type, and decide to reject the call using SIP response code 415. Knowing that the server will wait to receive call completion response from the other endpoints before making a decision as to which call completion response to forward back to the caller, E1 may want to force the server to send its response immediately. To do this, E1 can send a call completion response having a weight of 1.0 (i.e., Ms-Response-Priority: 1.0) and the parameter MustSendImmediately=True to the server. Upon receipt, the server will use E1's call completion response having SIP response code 415 to complete the call invitation.

In some embodiments, a callee endpoint auto-accepting a call invitation (i.e., accepting a call without having the callee actually accept the call) may send a call completion response that has a weight that is smaller than the weight used for one or more call completion responses that reject the call invitation. This allows the server to proxy a call completion response that may be rejecting the call, even though there is a call completion response that is accepting the call. By way of example, E1 above may not understand an extension in the call invitation, and decide to reject the call using SIP response code 420. But, E1 may determine that the caller endpoint is capable of retrying the call invitation (i.e., call) without the unsupported extension. Hence, E1 may set the weight to be 0.8 (e.g., MS-Response-Priority: 0.8). E2 above may auto-accept the call, but use a weight that is smaller than the weight that is used for the 420 call completion response, such as, by way of example, 0.7. The server inspects the call completion responses received from E1 and E2 and picks the call completion response with the highest weight (i.e., E1's call completion response having a weight of 0.8) even though E2 accepted the call, and forwards the call completion response having SIP response code 420 back to the caller. In some embodiments, a callee endpoint that accepts a call invitation (e.g., the endpoint allowed the callee to actually accept the call) may send a call completion response that has a weight that is smaller than the weight used for one or more call completion responses that reject the call invitation.

In some embodiments, the caller may specify a priority order that specifies a priority for the call completion responses the caller wants to receive. The caller may add a SIP header to its SIP INVITE message that indicates to the server whether the server should apply the specified priority order when selecting a call completion response to complete the call invitation. The caller can use the priority order to specify to the server the call completion response codes in the order that the caller wants to receive the responses, to indicate that the server is to forward the first call completion response it receives, etc. The caller may also use the priority order to specify a timeout value. The server will then wait for the specified timeout period to receive all of the call completion responses from the callee endpoints.

Associating a weight to a call completion response allows the client or callee endpoint to have better control over what call completion response code the remote or caller endpoint receives. Using the weights to control the call completion response code better allows the caller endpoint to retry the call invitation after varying some media or extensions. In case of failed calls, the caller endpoint may be able to show a more appropriate or informative error message to the caller.

FIG. 1 is a block diagram that illustrates the sending of a call invitation between a caller endpoint and a plurality of callee endpoints and the selection of an appropriate response to the invitation by a server, according to some embodiments.

As depicted, a caller 102 uses a caller endpoint 104 to send a call invitation 106 to invite a callee 108 into a conversation, such as, by way of example, an IM conversation, a VoIP conversation, an application sharing conversation, or other collaborative conversation. The call invitation may be routed through a server or multiple servers (not shown) until the call invitation is received by a server 110. For example, the call invitation may be routed within one or more communications networks, which may include the Internet, until it is received by the server. Upon receiving the call invitation for the callee, the server determines the callee's points of presence. For example, the callee may have registered an endpoint or multiple endpoints with a presence server (not shown). As depicted, the cal lee registered callee endpoints 112a, b and c with the presence server. Only three callee endpoints are shown in FIG. 1 for simplicity and one skilled in the art will appreciate that the callee may have registered a different number of endpoints. Upon identifying the callee's registered points of presence, for example, from the presence server, the server forwards, or forks, the call invitation from the caller to each of the callee's endpoints. Although not depicted, the server may also forward the call invitation to one or more other servers, which in turn may forward the call invitation to one or more additional endpoints of the callee.

Each callee endpoint receives and processes the call invitation. Each callee endpoint determines a proper call completion response for the call invitation, and calculates and associates a weight to the call completion response. Having determined the proper call completion response and the associated weight, each callee endpoint responds to the call invitation by sending its call completion response and its associated weight 114a-c to the server.

Subsequent to forwarding the call invitation to each of the callee's endpoints, the server waits for a predetermined period of time to receive responses to the call invitation from all of the callee's endpoints. Upon receiving the call completion responses and their associated weights from all of the callee's endpoints, or waiting for the predetermined period of time, the server selects from the received call completion responses the call completion response having the highest weight as the appropriate call completion response to use in completing the call. The server then forwards the response 116 to the caller in response to the call invitation. Subsequently, the caller endpoint receives and processes the response. In some embodiments, the caller may specify a priority order that lists one or more call responses in the order desired by the caller. If specified, the priority order overrides the weights that are associated with the call completion responses, and the server selects the appropriate call completion response from the received call completion responses based on the specified priority order.

The computing device on which the various techniques for selecting a call completion response based on weights associated with the call completion responses as described herein, including the server and the endpoint, may be implemented and executed may include a central processing unit, memory, input devices (e.g., keyboard and pointing devices), output devices (e.g., display devices), and storage devices (e.g., disk drives). The memory and storage devices are computer-readable media that may contain instructions that implement the presence information system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, a wired network, a wireless network, such as an IEEE 802.11 wireless network, and so on.

Embodiments of the techniques for selecting a call completion response based on weights associated with the call completion responses, including the server and the endpoint, may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The techniques for selecting a call completion response based on weights associated with the call completion responses may be described in the general context of computer-executable instructions, such as program modules, executed by one or more computers, including the server and the endpoints, or other devices. Generally, program modules include routines, programs, objects, components, data structures, and so on that perform particular tasks or implement particular abstract data types. Typically, the functionality of the program modules may be combined or distributed as desired in various embodiments.

Figure 2:
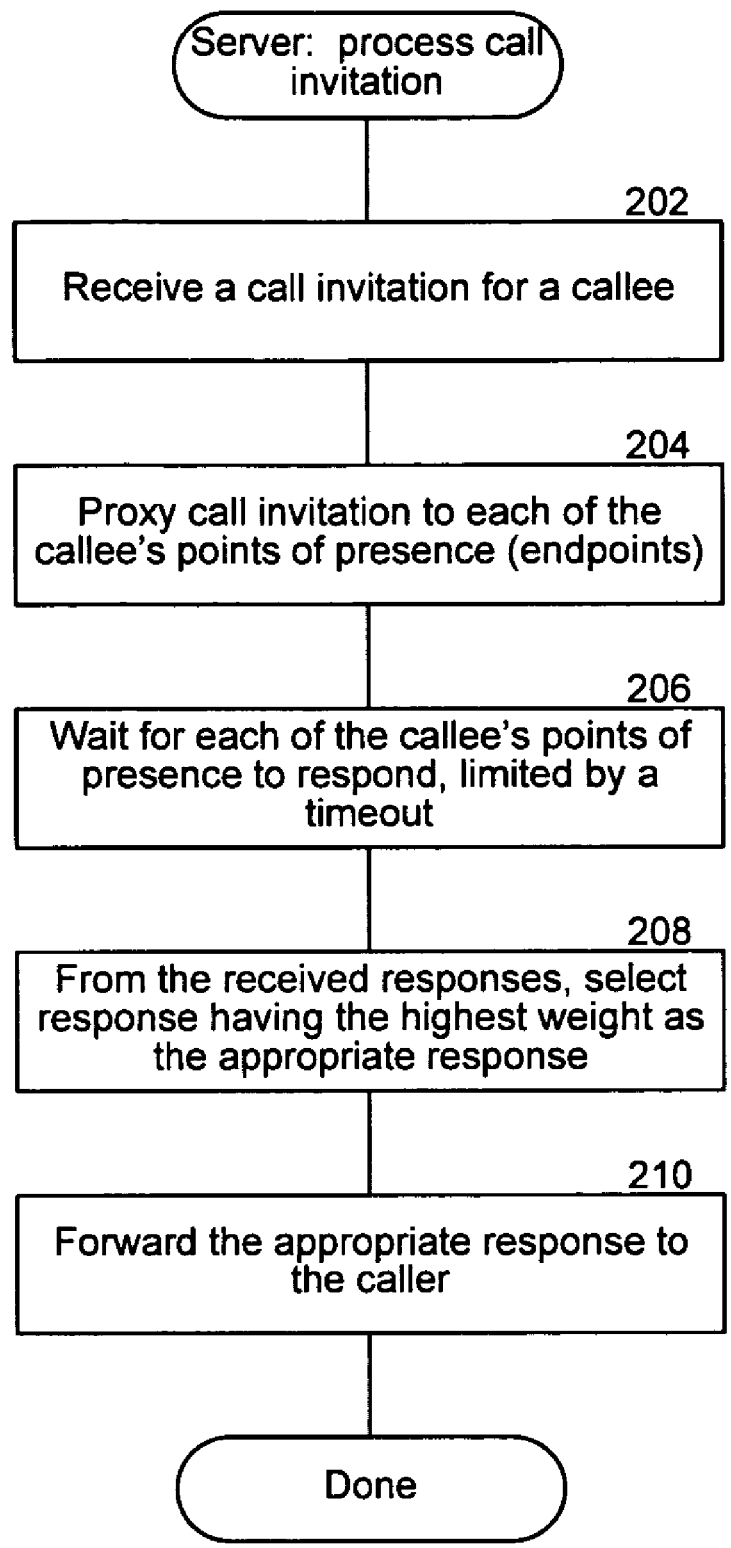
FIG. 2 is a flow diagram that illustrates the processing of a call invitation by a server, according to some embodiments.

FIG. 2 is a flow diagram that illustrates the processing of a call invitation by a server, according to some embodiments. In block 202, the server receives a call invitation for a callee. Upon receiving the call invitation, the server identifies the callee's points of presence. In block 204, the server proxies the call invitation to each of the callee's endpoints. In block 206, the server waits for each of the callee's endpoints to respond to the call invitation, limited by a timeout. Subsequently, after receiving call completion responses from all of the callee's endpoints or, alternatively, the timeout occurring, in block 208, the server selects from the received call completion responses the call completion response having the highest weight as an appropriate call completion response. In the instance where two or more call completion responses have the same weight, the server arbitrarily selects (e.g., first received, etc.) one of the call completion responses as the appropriate call completion response. In block 210, the server forwards the appropriate call completion response to the caller in response to the call invitation.

In some embodiments, the server forwards the first call completion response accepting the call invitation that is received to the caller without waiting to receive the call completion responses from the remaining endpoints. In some embodiments, the server forwards the first call completion response having the maximum weight (e.g., 1.0) that is received to the caller without waiting to receive the call completion responses from the remaining endpoints. In some embodiments, the server forwards the first call completion response accepting the call invitation and which has the maximum weight that is received to the caller without waiting to receive the call completion responses from the remaining endpoints. In some embodiments, the server waits to receive all of the call completion responses, or until a timeout occurs, before selecting and forwarding a call completion response to the caller.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 3:
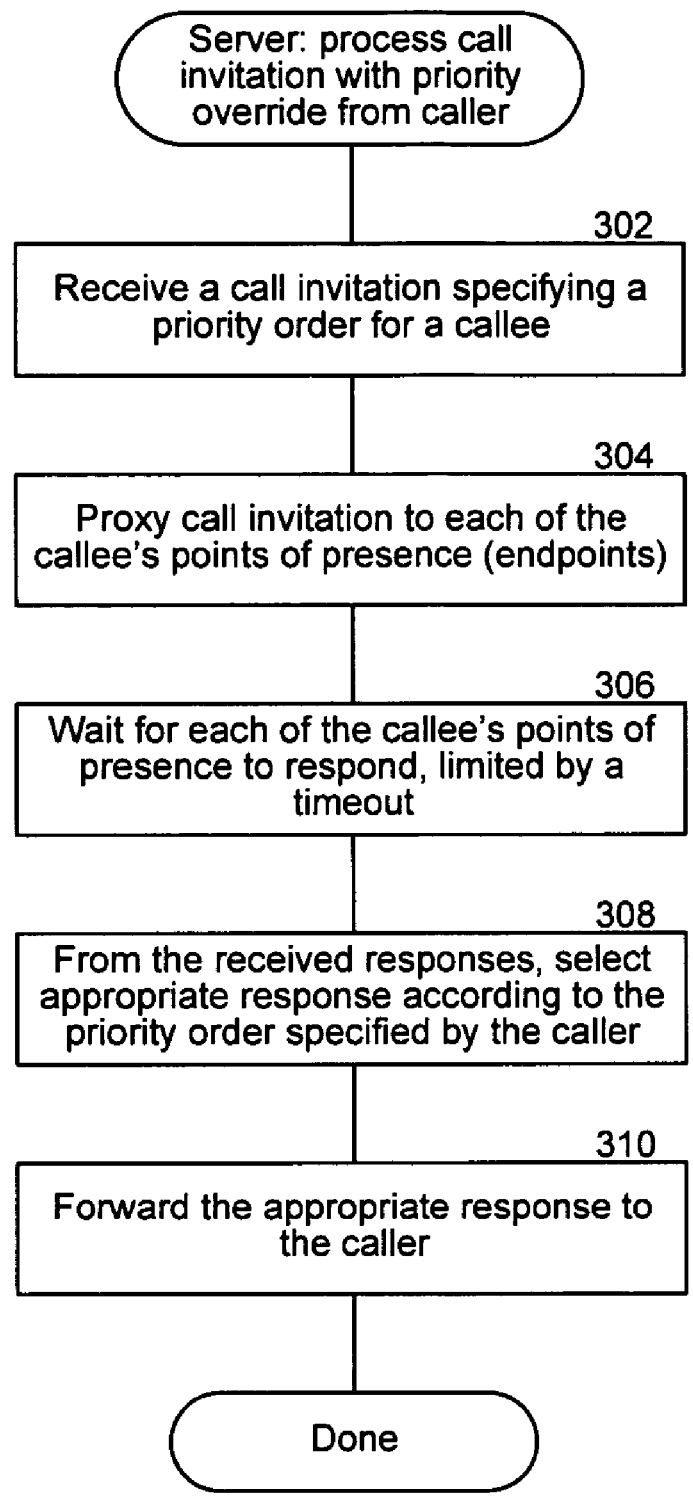
FIG. 3 is a flow diagram that illustrates the processing of a call invitation with priority override by a server, according to some embodiments.

FIG. 3 is a flow diagram that illustrates the processing of a call invitation with priority override by a server, according to some embodiments. In block 302, the server receives a call invitation specifying a priority order for a callee. Upon receiving the call invitation, the server identifies the callee's points of presence. The server may remove the priority order from the call invitation and store the priority order in memory for later retrieval. In block 304, the server proxies the call invitation to each of the callee's endpoints. In block 306, the server waits for each of the callee's endpoints to respond to the call invitation, limited by a timeout. Subsequently, after receiving call completion responses from all of the callee's endpoints or, alternatively, the timeout occurring, in block 308, the server selects an appropriate call completion response from the received call completion responses according to the priority order specified by the callee. In the instance where two or more call completion responses have the same priority, the server arbitrarily selects one of the call completion responses as the appropriate call completion response. In block 310, the server forwards the appropriate call completion response to the caller in response to the call invitation.

Figure 4:
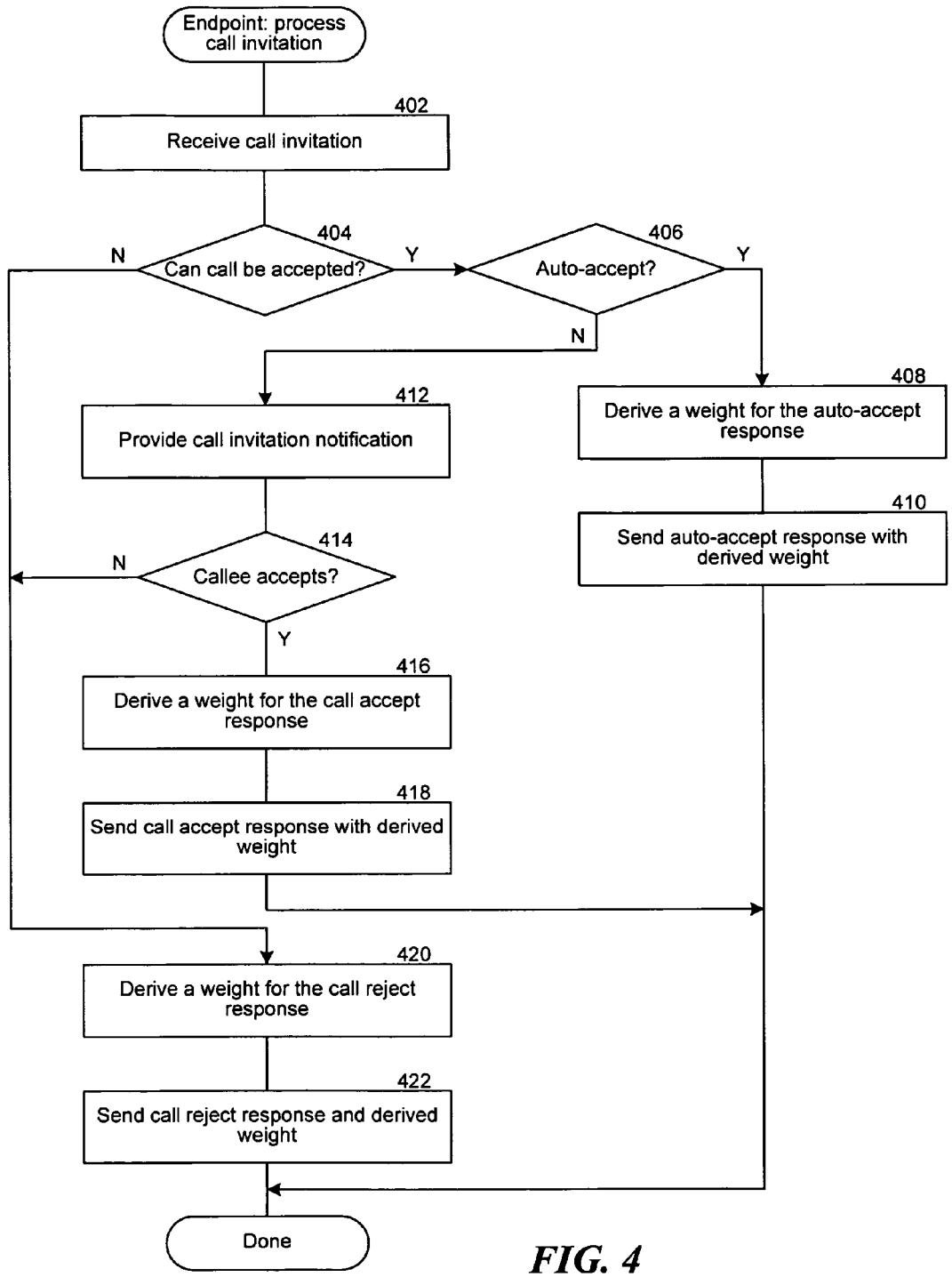
FIG. 4 is a flow diagram that illustrates the processing of a call invitation by an endpoint, according to some embodiments.

FIG. 4 is a flow diagram that illustrates the processing of a call invitation by an endpoint, according to some embodiments. A call invitation for a callee is received by each of the callee's endpoints. In some embodiments, a software facility, such as a client application (e.g., client IM application, client VoIP application, etc.) executes on each endpoint and processes the call invitation. In block 402, the endpoint receives the call invitation. In block 404, the endpoint checks to determine whether the call can be accepted. For example, the endpoint checks the call invitation to determine whether the endpoint can support the services/functions/extensions/etc. that are requested in the call invitation. If the endpoint determines that the call can be accepted, then, in block 406, the endpoint checks to determine whether it should auto-accept the call. If the endpoint determines that it should auto-accept the call, then, in block 408, the endpoint derives a weight for the auto-accept response and, in block 410, sends the auto-accept response with the derived weight as a response to the received call invitation.

If, in block 406, the endpoint determines that it should not auto-accept the call, then, in block 412, the endpoint provides a call invitation notification. For example, the endpoint can provide a visual notification on a coupled screen and/or an audible notification on a coupled audio device to inform the callee of the received call invitation. In block 414, the endpoint checks to determine whether the callee accepted the call invitation. In some embodiments, the endpoint may wait for a predetermined period of time for the callee to manually accept (or refuse) the call invitation. If the endpoint determines that the callee accepted the call, then, in block 416, the endpoint derives a weight for the call accept response and, in block 418, sends the call accept response with the derived weight as a response to the received call invitation.

Otherwise, if the endpoint determined that the callee did not accept the call or, if, in block 404, the endpoint determined that the call cannot be accepted, then, in block 420, the endpoint derives a weight for the call reject response. In block 422, the endpoint sends the call reject response with the derived weight as a response to the received call invitation.

Figure 5:
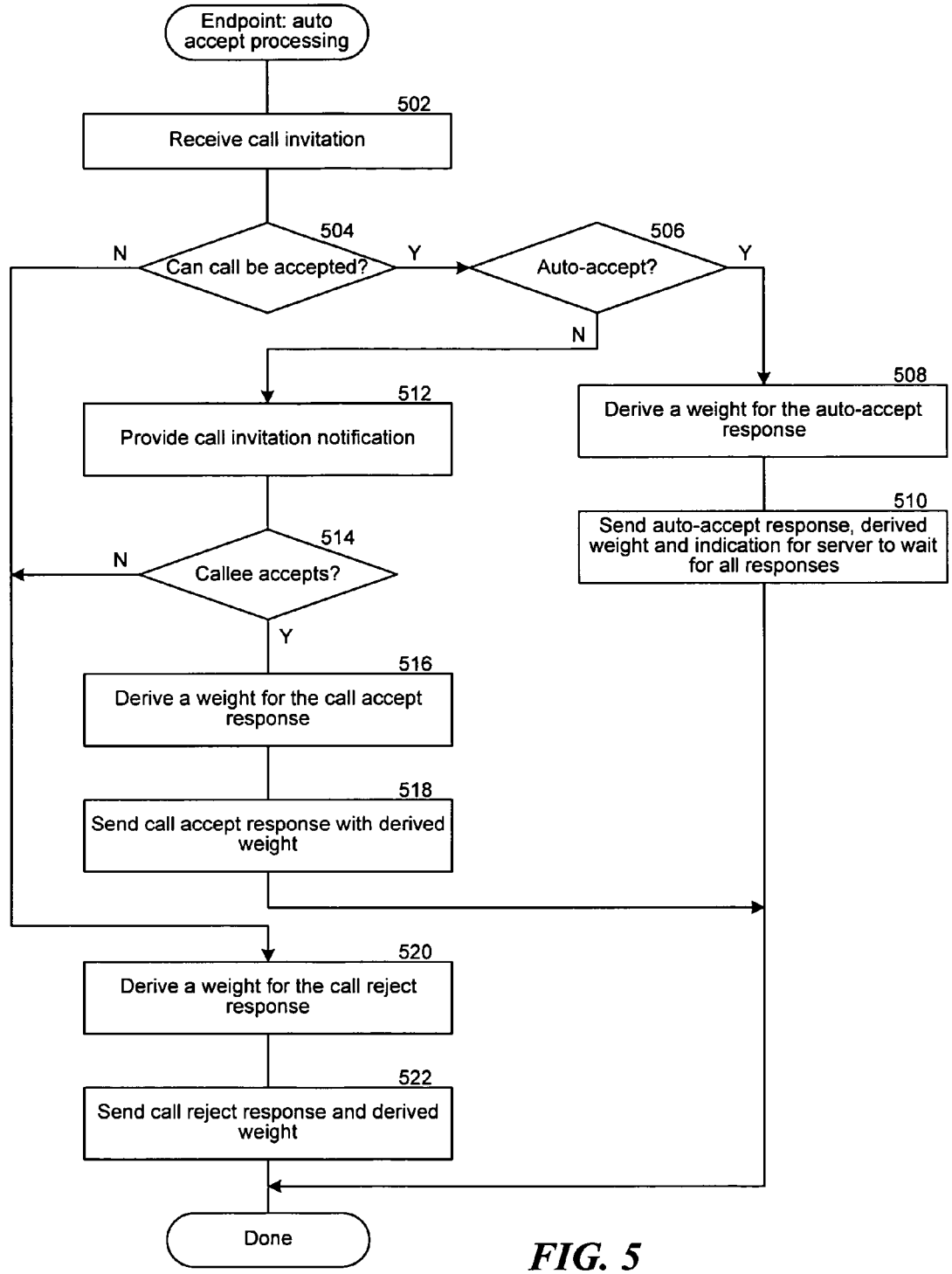
FIG. 5 is a flow diagram that illustrates an auto-accept processing of a call invitation by an endpoint, according to some embodiments.

FIG. 5 is a flow diagram that illustrates an auto-accept processing of a call invitation by an endpoint, according to some embodiments. When the endpoint is auto-accepting a call invitation, the endpoint provides an indication that tells the server to wait for the call completion responses from the other endpoints before selecting a call completion response to use in completing the call. In this instance, the endpoint may derive a weight as a function of current availability of the callee, the activity of the callee on the endpoint device, and the endpoint device capabilities. Deriving the weight in this manner may result in different weights being calculated by multiple endpoints that are accepting the call invitation. The server can use the weight to select the appropriate call accept response to use in completing the call. In block 502, the endpoint receives the call invitation. In block 504, the endpoint checks to determine whether the call can be accepted. If the endpoint determines that the call can be accepted, then, in block 506, the endpoint checks to determine whether it should auto-accept the call. If the endpoint determines that it should auto-accept the call, then, in block 508, the endpoint derives a weight for the auto-accept response. In block 510, the endpoint sends as a response to the call invitation the auto-accept response, the derived weight, and an indication for the receiver of the auto-accept response (e.g., server) to wait for the call completion responses from the other endpoints of the callee before selecting an appropriate call completion response.

If, in block 506, the endpoint determines that it should not auto-accept the call, then, in block 512, the endpoint provides a call invitation notification to notify the callee of the call invitation. In block 514, the endpoint checks to determine whether the callee accepted the call invitation. If the endpoint determines that the callee accepted the call, then, in block 516, the endpoint derives a weight for the call accept response and, in block 518, sends the call accept response with the derived weight as a response to the received call invitation. Otherwise, if the endpoint determined that the callee did not accept the call or, if, in block 504, the endpoint determined that the call cannot be accepted, then, in block 520, the endpoint derives a weight for the call reject response. In block 522, the endpoint sends the call reject response with the derived weight as a response to the received call invitation.

Figure 6:
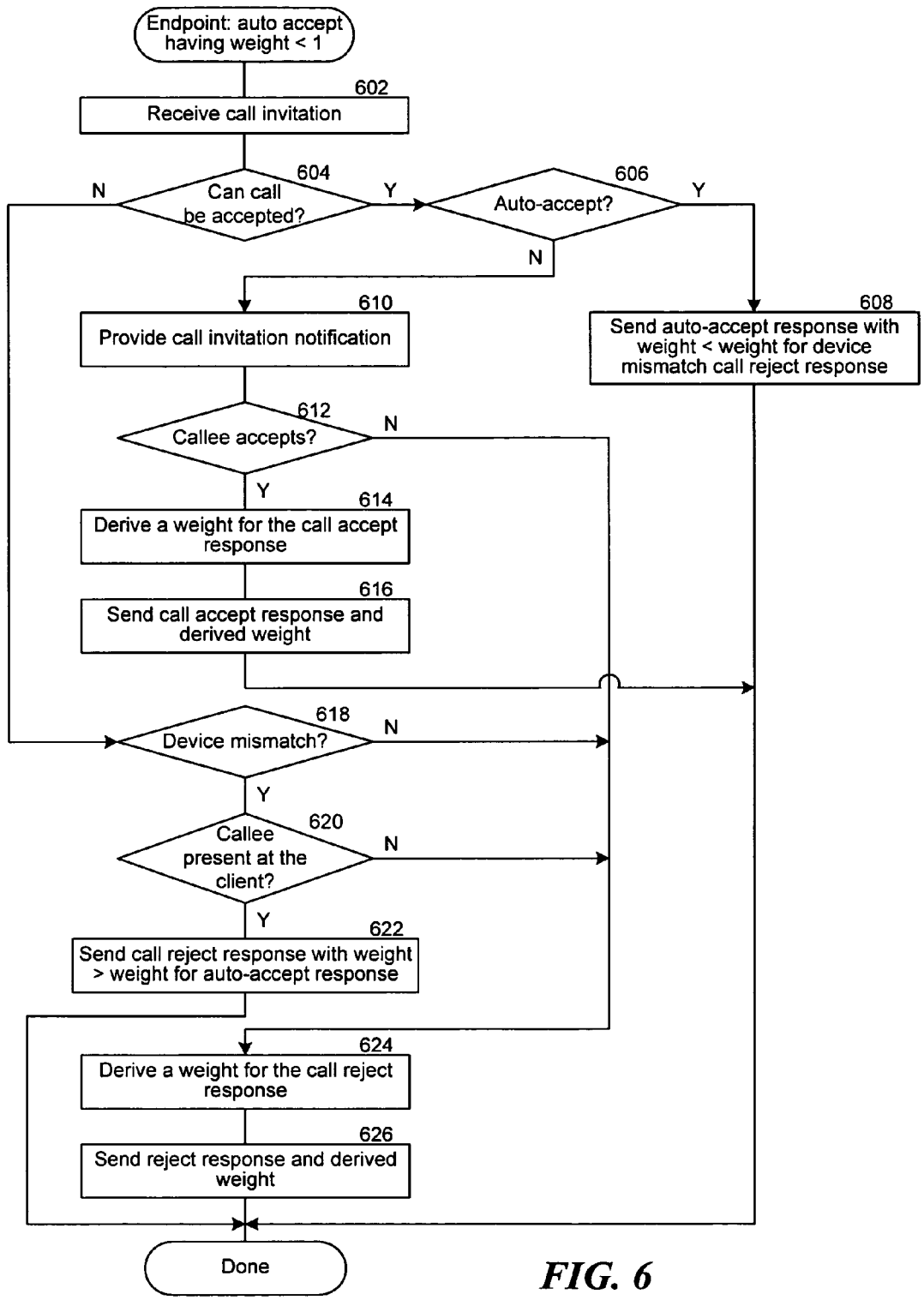
FIG. 6 is a flow diagram that illustrates an auto-accept processing of a call invitation by an endpoint, according to some other embodiments.

FIG. 6 is a flow diagram that illustrates an auto-accept processing of a call invitation by an endpoint, according to some other embodiments. When the endpoint is auto-accepting a call invitation, the endpoint associates a weight that is lower than the weight associated with one or more other call completion responses. For example, the weight associated with an auto-accept response may be lower than the weight associated with a call reject response due to device mismatch (e.g., call completion response having SIP response code 420). Thus, between an auto-accept response from a first endpoint and a call reject response due to device mismatch from a second endpoint, the server can proxy the call reject response due to device mismatch in order to give the caller endpoint an opportunity to retry the call invitation without the unsupported extensions, and the callee a chance to accept the call on the second endpoint. In block 602, the endpoint receives the call invitation. In block 604, the endpoint checks to determine whether the call can be accepted. If the endpoint determines that the call can be accepted, then, in block 606, the endpoint checks to determine whether it should auto-accept the call. If the endpoint determines that it should auto-accept the call, then, in block 608, the endpoint sends an auto-accept response having a weight that is lower than a weight it would have associated to a call reject response due to device mismatch as a response to the call invitation. The endpoint associates to the auto-accept response a weight that is smaller than the weight the endpoint would have derived upon detecting a device mismatch.

If, in block 606, the endpoint determines that it should not auto-accept the call, then, in block 610, the endpoint provides a call invitation notification to notify the callee of the call invitation. In block 612, the endpoint checks to determine whether the callee accepted the call invitation. If the endpoint determines that the callee accepted the call, then, in block 614, the endpoint derives a weight for the call accept response and, in block 616, sends the call accept response with the derived weight as a response to the received call invitation. Otherwise, if the endpoint determined that the callee did not accept the call, then, in block 624, the endpoint derives a weight for the call reject response and, in block 626, sends the call reject response with the derived weight as a response to the received call invitation.

If, in block 604, the endpoint determined that the call cannot be accepted, then, in block 618, the endpoint checks to determine whether the call cannot be accepted due to a device mismatch between the caller's endpoint and the this particular endpoint. If the endpoint determines that the call cannot be accepted because of a device mismatch, then, in block 620, the endpoint checks to determine whether the callee is present at the endpoint. For example, the endpoint may determine that the callee is currently at the endpoint by detecting activity on its input device (e.g., keyboard). If the endpoint determines that the callee is present at the endpoint, then, in block 622, the endpoint sends a call reject response having a weight that is higher than the weight associated with an auto-accept response as a response to the call invitation. Otherwise, if the endpoint determined that that the call cannot be accepted because of a reason other than device mismatch (block 618) or that the callee is not present at the endpoint (block 620), then, in block 624, the endpoint derives a weight for the call reject response and, in block 626, sends the call reject response with the derived weight as a response to the received call invitation.

From the foregoing, it will be appreciated that various embodiments of the techniques for selecting a call completion response based on weights associated with the call completion responses have been described herein for purposes of illustration, but that various modifications may be made without deviating from the spirit and scope of the invention. For example, even though the call invitations and call responses, including the indication of the weights and other parameters were described in the context of SIP messages, SIP extensions and SIP parameters, one skilled in the art will appreciate that various other well-known messaging communication protocols may also be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I/We claim:

1. A method in a computer system for selecting a call completion response, the method comprising:
   at a server,
      receiving a call invitation for a callee;
      forwarding the call invitation to each of the callee's endpoints; and
      after the call invitation is forwarded to each of the callee's endpoints;
         receiving from at least some of the callee's endpoints call completion responses, each received call completion response specifying a weight and whether to accept or reject the call invitation;
         upon completion of a timeout starting based on the forwarding of the call invitation or upon receiving a received call completion response from each of the callee's endpoints, selecting an appropriate received call completion response using the weight specified by each received call completion response to decide which received call completion response to select such that a received call completion response that specifies to reject the call invitation is selected when its weight indicates that it should be selected over a received call completion response that specifies to accept the call invitation; and
         forwarding the selected appropriate received call completion response as a response to the call invitation.

2. The method of claim 1, wherein the server and callee's endpoints communicate using SIP.

3. The method of claim 1, wherein the server is a forking server.

4. The method of claim 1, wherein the weight is derived at least in part on the callee's presence information.

5. The method of claim 1, wherein the weight is derived at least in part on the endpoint's functional capabilities.

6. The method of claim 1, wherein the weight is derived at least in part on the endpoint's usage history.

7. A computing device for responding to a call invitation from a caller directed to a callee with multiple callee endpoints, comprising:
   a component that receives from a caller endpoint the call invitation for a callee to join in a call with the caller;
   a component that forwards the received call invitation to each of the multiple callee endpoints; and
   a component that, after the call invitation is forwarded to each of the multiple callee endpoints,
      receives from a first callee endpoint of the multiple callee endpoints a first call completion response, the first call completion response associated with a first weight derived by the first callee endpoint, the first weight indicating whether the first callee endpoint considers the first callee endpoint to be an appropriate callee endpoint to respond to the call invitation;
      receives from a second callee endpoint of the multiple callee endpoints a second call completion response, the second call completion response associated with a second weight, different from the first weight, and derived by the second callee endpoint, the second weight indicating whether the second callee endpoint considers the second callee endpoint to be the appropriate callee endpoint to respond to the call invitation;
      selects one of the first and second call completion responses based on the associated first weight and second weight such that when the first call completion response specifies to reject the call invitation and the second call completion response indicates to accept the call invitation, the first call completion response is selected over the second call completion response when the first and second weights indicate that the first callee completion response is a more appropriate response; and forwards the selected call completion response to the caller endpoint as a response to the call invitation.

8. The computing device of claim 7 wherein after a predetermined period of time, the selecting occurs from among the received call completion responses even though a call completion response has not yet been received from all callee endpoints.

9. The computing device of claim 7 wherein a callee endpoint derives a weight based on factors selected from a group consisting of presence of the callee, capabilities of the callee endpoint, and usage history of the callee endpoint.

10. The computing device of claim 7 wherein the call invitation indicates a priority order for call completion responses that the caller endpoint wants to receive.

* * * * *